United States Patent
Kafle et al.

(10) Patent No.: US 10,264,038 B2
(45) Date of Patent: Apr. 16, 2019

(54) DISCOVERY AND MANAGEMENT OF SYNCHRONOUS AUDIO OR VIDEO STREAMING SERVICE TO MULTIPLE SINKS IN WIRELESS DISPLAY SYSTEM

(71) Applicant: QUALCOMM Incorporated, San Diego, CA (US)

(72) Inventors: Padam Lal Kafle, San Diego, CA (US); Shivraj Singh Sandhu, Milpitas, CA (US); Vijay Naicker Subramaniam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 14/957,410

(22) Filed: Dec. 2, 2015

(65) Prior Publication Data

US 2016/0164933 A1   Jun. 9, 2016

Related U.S. Application Data

(60) Provisional application No. 62/087,600, filed on Dec. 4, 2014.

(51) Int. Cl.
*G06F 13/00* (2006.01)
*H04L 29/06* (2006.01)
(Continued)

(52) U.S. Cl.
CPC ...... *H04L 65/4069* (2013.01); *H04L 65/1069* (2013.01); *H04L 67/16* (2013.01);
(Continued)

(58) Field of Classification Search
CPC ..... G06Q 30/02; H04L 12/185; H04L 12/189; H04L 29/06; H04L 29/0809;
(Continued)

(56) References Cited

U.S. PATENT DOCUMENTS

| 6,474,159 B1 | 11/2002 | Foxlin et al. |
| 2013/0234913 A1* | 9/2013 | Thangadorai ........ G06F 3/1423 345/2.1 |
| 2014/0330927 A1 | 11/2014 | Qi et al. |

FOREIGN PATENT DOCUMENTS

| CA | 2897007 A1 | 7/2014 |
| EP | 2640100 A1 | 9/2013 |
| WO | WO-2014189641 A1 | 11/2014 |

OTHER PUBLICATIONS

Camps-Mur et al., "Device to Device Communications with WiFi Direct: Overview and Experimentation," IEEE Wireless Communications, vol. 20, Issue 3, Jun. 2013, 8 pgs., Institute of Electrical and Electronics.

(Continued)

*Primary Examiner* — Robert B Harrell
(74) *Attorney, Agent, or Firm* — Holland & Hart LLP/Qualcomm

(57) ABSTRACT

Methods, systems, and devices are described for service discovery and session establishment framework to enable a synchronous audio/video streaming service from a source to multiple sink devices. In accordance with the present disclosure, a plurality of sink devices (e.g., Wi-Fi speakers) may be deployed in a flexible (e.g., plug-and-play) fashion and may be discoverable by the source device. In some examples, the devices from multiple vendors may interoperate and easily connect with the source device for flexible configuration based on the media content or number of available sink devices. Thus, the present disclosure provides a method for service specific discovery associated with synchronous audio/video streaming by utilizing Application Service Platform (ASP) service discovery prior to establishment of a display service session from a source device to multiple sink devices.

40 Claims, 10 Drawing Sheets

(51) Int. Cl.

| | | |
|---|---|---|
| *H04L 29/08* | (2006.01) | |
| *H04W 84/12* | (2009.01) | |
| *H04W 8/00* | (2009.01) | |
| *H04W 4/70* | (2018.01) | |
| *H04W 76/14* | (2018.01) | |
| *H04W 76/10* | (2018.01) | |
| *H04W 76/23* | (2018.01) | |
| *H04W 76/20* | (2018.01) | |

(52) U.S. Cl.
CPC ............. *H04W 4/70* (2018.02); *H04W 8/005* (2013.01); *H04W 76/10* (2018.02); *H04W 76/14* (2018.02); *H04W 84/12* (2013.01); *H04W 76/20* (2018.02); *H04W 76/23* (2018.02)

(58) Field of Classification Search
CPC ......... H04L 29/08072; H04L 29/08117; H04L 65/1069; H04L 65/4069; H04L 67/16; H04W 4/06; H04W 72/005; H04W 8/26; H04W 4/70; H04W 8/005; H04W 76/10; H04W 76/14; H04W 76/20; H04W 76/23; H04W 84/12; A63F 2300/402; A63F 2300/409; G06F 3/14; G06F 3/147; G06F 3/153; G06F 3/1423; G06F 13/00
USPC .......................... 370/312; 709/219; 345/2.1
See application file for complete search history.

(56) References Cited

OTHER PUBLICATIONS

ISA/EPO, International Search Report and Written Opinion of the International Searching Authority, Int'l Appl. No. PCT/US2015/063700, dated Apr. 7, 2016, European Patent Office, Rijswijk, NL, 11 pgs.

* cited by examiner

DISCOVERY AND MANAGEMENT OF SYNCHRONOUS AUDIO OR VIDEO STREAMING SERVICE TO MULTIPLE SINKS IN WIRELESS DISPLAY SYSTEM

CROSS REFERENCES

The present Application for Patent claims priority to U.S. Provisional Patent Application No. 62/087,600 by Kafle et al., titled "Discovery and Management of Synchronous Audio and Video Streaming Service to Multiple Sinks in Wireless Display System," filed Dec. 4, 2014, assigned to the assignee hereof, and expressly incorporated by reference herein.

BACKGROUND

The following relates generally to wireless communication, and more specifically to discovery and management of synchronous audio and video streaming service to multiple sinks in a wireless display system. Wireless communications systems are widely deployed to provide various types of communication content such as voice, video, packet data, messaging, broadcast, and so on. These systems may be wireless local area network (WLAN), also known as Wi-Fi systems which utilize carrier sense multiple access with collision avoidance (CSMA/CA) mechanisms to access a wireless medium. These systems may also be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

As mobile devices are used to capture or generate content such as audio, video, or multimedia, users may desire to share content between mobile devices and other devices such as TVs, computers, audio systems, and the like. One approach is for one device (i.e., a sink device) to mirror what is displayed on another device (i.e., a source device). Thus, a source device may be a content producer, while the sink device may function as a content consumer. Examples of a source device may include a smartphone, tablet, and the like. Examples of a sink device may include a TV, computer screen, speaker etc. In some applications, the source device may transmit the media stream over a wireless link. For example, a Wi-Fi peer-to-peer (P2P) network may allow wireless devices to directly communicate with each other. Devices within range of each other may discover and communicate directly without involving central access points. However, conventional methods of establishing wireless peer-to-peer connection lack means for supporting synchronized service discovery for multiple sink devices.

SUMMARY

The described features generally relate to one or more improved systems, methods, and/or apparatuses for service discovery and session establishment framework to enable at least one of a synchronous audio only or video only or audio and video streaming service from a source to multiple sink devices. In accordance with the present disclosure, a plurality of sink devices (e.g., Wi-Fi speakers) may be deployed in a flexible (e.g., plug-and-play) fashion and may be discoverable by the source device. In some examples, the devices from multiple vendors may interoperate and easily connect with the source device for flexible configuration based on the media content or number of available sink devices. Thus, the present disclosure provides a method for service specific discovery associated with audio/video streaming by utilizing Application Service Platform (ASP) service discovery prior to establishment of a Wi-Fi Display connection over peer-to-peer (P2P) or Wi-Fi infra-structure connection from a source device to multiple sink devices.

A method of wireless communication at a UE is described. The method may include receiving service capabilities (e.g., audio and/or video capabilities) of each of a plurality of sink devices, determining that the service capabilities of the plurality of sink devices correspond with at least one streaming service sought by the source device, and establishing, prior to establishing a Wi-Fi based connection from the source device to the plurality of sink devices, an application service platform (ASP) service discovery session between the source device and the plurality of sink devices based at least in part on the determining.

An apparatus for wireless communication at a source device is described. The apparatus may include a service discovery component for receiving service capabilities (e.g., audio and/or video capabilities) of each of a plurality of sink devices, a service requirement component for determining that the service capabilities of the plurality of sink devices correspond with at least one streaming service sought by the source device, and a communication establishment component for establishing, prior to establishing a Wi-Fi based connection from the source device to the plurality of sink devices, an application service platform (ASP) service discovery session between the source device and the plurality of sink devices based at least in part on the determining.

A further apparatus for wireless communication at a source device is described. The apparatus may include a processor, memory in electronic communication with the processor, and instructions stored in the memory, wherein the instructions are executable by the processor to receive service capabilities (e.g., audio and/or video capabilities) of each of a plurality of sink devices, determine that the service capabilities of the plurality of sink devices correspond with at least one streaming service sought by the source device, and establish, prior to establishing a Wi-Fi based connection from the source device to the plurality of sink devices, an application service platform (ASP) service discovery session between the source device and the plurality of sink devices based at least in part on the determining.

A non-transitory computer-readable medium storing code for wireless communication at a source device is described. The code may include instructions executable to receive service capabilities (e.g., audio and/or video capabilities) of each of a plurality of sink devices, determine that the service capabilities of the plurality of sink devices correspond with at least one streaming service sought by the source device, and establish, prior to establishing a Wi-Fi based connection from the source device to the plurality of sink devices, an application service platform (ASP) service discovery session between the source device and the plurality of sink devices based at least in part on the determining.

Some examples of the method, apparatuses, or non-transitory computer-readable medium described above may further include processes, features, means, or instructions for transmitting a parameter request message to the plurality of sink devices for service information required for a synchronous streaming service setup. Additionally or alternatively, in some examples the parameter request message includes an audio codec parameter indicating an audio codec and a mode associated with audio streaming.

In some examples of the method, apparatuses, or non-transitory computer-readable medium described above, the parameter request message queries a pre-assigned roles of the plurality of sink devices. Additionally or alternatively, some examples may include processes, features, means, or instructions for mapping the plurality of sink devices based at least in part on the capabilities of the sink devices to render content type.

In some examples of the method, apparatuses, or non-transitory computer-readable medium described above, the service capabilities of the plurality of sink devices are received in response to the source device initiating a service discovery. Additionally or alternatively, some examples may include processes, features, means, or instructions for displaying a name or an identification (ID) indicating the role of at least one sink device on a display of the source device.

In some examples of the method, apparatuses, or non-transitory computer-readable medium described above, the ASP session between the source device and the plurality of sink devices capable of a synchronous streaming service is performed over an infra-structure network. Additionally or alternatively, some examples may include processes, features, means, or instructions for initiating post-association capability negotiation between the source device and the plurality of sink devices, wherein the post-association capability negotiation utilizes real time streaming protocol (RTSP) in a TCP connection between the source device and the plurality of sink devices.

In some examples of the method, apparatuses, or non-transitory computer-readable medium described above, the post-association capability negotiation comprises a setup request from the source device to include audio/video streaming configuration parameter to setup synchronous streaming session. Additionally or alternatively, in some examples the service capabilities include at least one of device information, associated basic service set identification (BSSID), supported audio formats, supported video formats, three-dimensional (3-D) video format, content protection, coupled sink information, extended capability, local internet protocol (IP) address, display session information, medium access control (MAC) address, synchronous streaming information, or concurrent session capability, or a combination thereof.

In some examples of the method, apparatuses, or non-transitory computer-readable medium described above, the synchronous audio/video streaming information includes at least one of a type of sink device, a type of content for synchronous rendering, content handling capability, pre-configured role of the plurality of sink devices, supported method of timing synchronization, supported connection topology and discovery methods, or vendor information, or a combination thereof. The plurality of sink devices transmit service information containing capabilities required to setup synchronous streaming service for query corresponding to service discovery of the synchronous audio or video streaming service received from the source device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Although the present disclosure is described with reference to audio content, it should be understood by those in the art that the concepts of the disclosure may be adapted to any content, such as audio, video, or multimedia transmitted by a source device to a plurality of sink devices. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second label.

DETAILED DESCRIPTION

Described embodiments are directed to systems and methods for the source device to coordinate synchronous audio/video streaming service with a plurality of sink devices. As discussed above, a source device may be a content producer (e.g., audio/video content), while the sink device may function as a content consumer. Therefore, in some examples, the content originating at the source device may be rendered by one or more sink devices in the wireless display system. In accordance with the present disclosure, the source device may be configured to discover the roles and capabilities of a plurality of sink devices (e.g., device type, speaker type, audio decoding formats etc.). Based on the discovered sink devices, the source device may determine whether the capabilities of one or more sink devices correspond with the required setup for the audio service/profile. Accordingly, once the required audio service criteria for the source device is determined to match the capabilities of one or more of the sink devices, the source device may establish an ASP session between the source device and the plurality of sink devices.

In accordance with the present disclosure, the source device may initiate discovery and connection setup with a plurality of sink devices. For example, applications running on the source device may display the name(s) of the sink device(s) that are discovered through a discovery process. Accordingly, the source device may map the discovered sink devices (e.g., Wi-Fi speakers) based on the content type or profiles such as stereo audio profile, 5.1 audio, 7.1 audio. In some examples, the source device may allow the user to select the sink device names based on the profile.

Additionally or alternatively, the source and sink devices may seek and advertise the audio/video streaming specific service information as a wireless display service. The wireless device service may include a source device (i.e., origin of content) and a plurality of sink devices (i.e., recipient of content). In some examples, the source device may support the service seeker role for the display service, while the sink device may support the service advertiser role for the display service. Accordingly, multi-sink audio/video streaming service may specify as a sub-service or service profile within the display service with unique service information in order to coordinate synchronous audio/video streaming. In some examples, of the present disclosure, the service discovery of audio/video services may be processed during a pre-association state or during an existing infra-structure connection.

Figure 1:
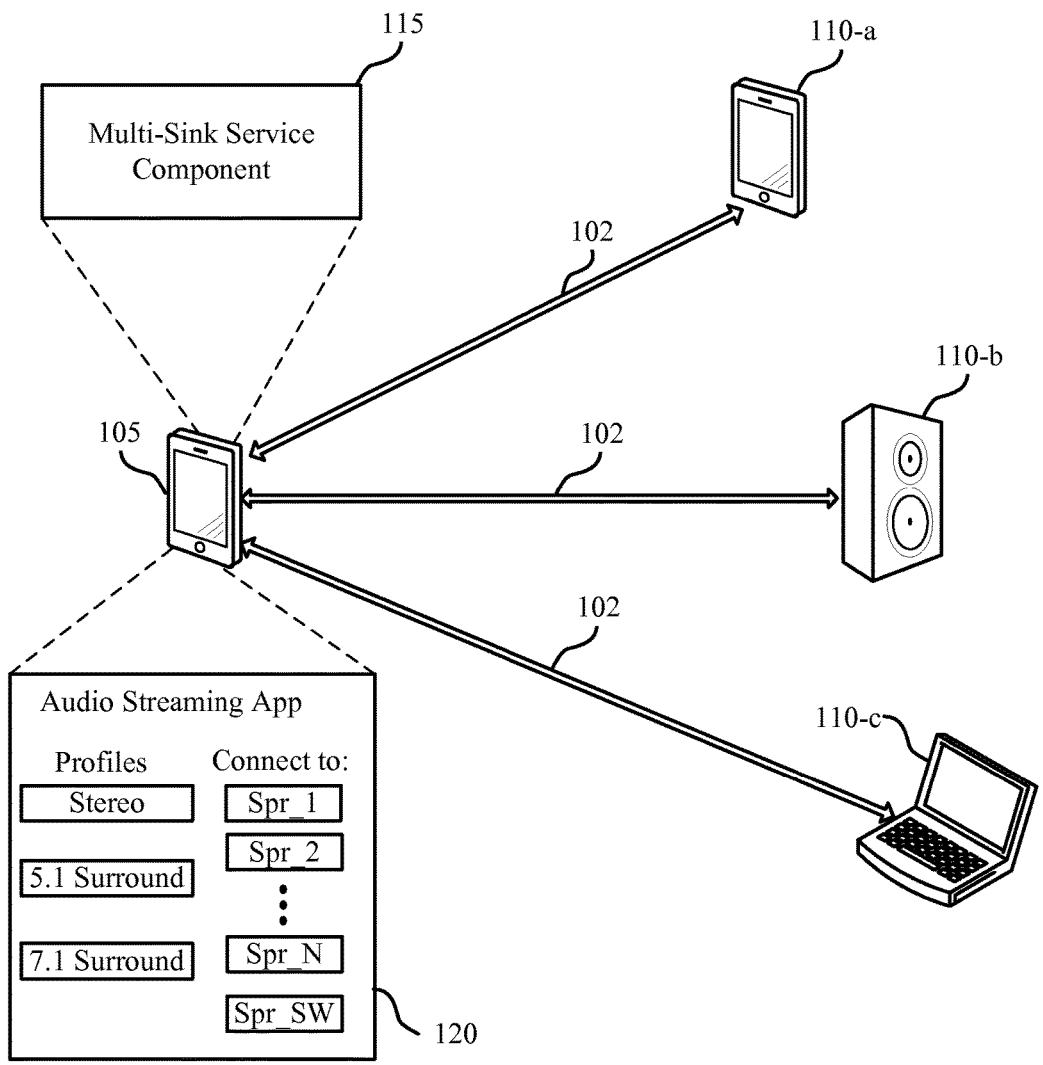
FIG. 1 illustrates an example of a wireless communications system for discovery and management of synchronous audio/video streaming service to multiple sinks in wireless display system in accordance with various aspects of the present disclosure.

Referring now to FIG. 1, a system 100 includes a source device 105 and a plurality of sink devices 110 and may include one or more access points (not shown). Examples of the source device 105 may include, but are not limited to, smartphones, cell phones, wearable computing devices, tablets, personal digital assistants (PDAs), laptops, or any other device capable of communicating with a sink device 110 via a link 102 (e.g., wired, cellular wireless, Wi-Fi, etc). Examples of the sink devices 110 may include, but are not limited to, in-vehicle infotainment devices, TVs, computers, laptops, projectors, cameras, smartphones, speakers, wireless headphones, wearable computing devices, or any other device capable of communicating with a source device 105 and relaying (i.e., display or audio) content received from the source device 105. The sink devices 110 may be a combination of devices. For example, the sink device 110 may include a display device and a separate device for receiving, buffering, and decoding content for display on the display device. In some examples, the source device 105 may include a multi-sink service component 115 configured to execute the methods of the present disclosure. In some examples, the multi-sink service component 115 may be an example of multi-sink service component 510 described with reference to FIGS. 5-9.

Source device 105 may be connected to sink device 110 via link 102. Link 102 illustrated in FIG. 1 may be a wired or wireless link in some embodiments. Communications between a source device 105 and a sink device 110, connected via a wireless peer-to-peer connection, may be configured to remotely render content of the source device 105 at the sink devices 110. Wireless remote display includes, but is not limited to the Wi-Fi Display specification, also known as Miracast® from Wi-Fi Alliance, Discovery and Launch (DIAL), Digital Living Network Alliance® (DLNA), Airplay, WirelessHD, Wireless Home Digital Interface (WHDI), Intel's Wireless Display (Wi-Di) technology, and Ultra-wideband (UWB) connections. While the following techniques are described using the wireless networking architecture illustrated in FIG. 1, the described techniques are applicable to any suitable wired or wireless communication technology.

In some examples, the link 102 between the source device 105 and sink devices 110 may be bi-directional. In one configuration, the connection between the source device 105 and a sink devices 110 may also allow users to launch applications stored on the source device 105 via the sink devices 110. For example, the sink devices 110 may include various input controls (e.g., mouse, keyboard, knobs, keys, user interface buttons). These controls may be used at the sink device 110 to initialize and interact during the audio/video streaming from the source through the media applications stored on the source device 105.

In one embodiment, the source device 105 may be connected to the sink devices 110 via a Wi-Fi Display connection. Wi-Fi Display protocol, which may be known as Miracast, allows a portable device or computer to transmit media content (e.g., video, audio, images, etc.) to a compatible display wirelessly. It enables delivery of compressed standard or high-definition video/audio over a link 102. It also may allow users to echo the display from one device onto the display of another device. A link 102 may be a direct wireless link (e.g., peer-to-peer link), or an indirect wireless link through a Wi-Fi access point (not shown). Examples of direct wireless links include Wi-Fi Direct connections and connections established by using a Wi-Fi Tunneled Direct Link Setup (TDLS) link.

In accordance with the present disclosure, system 100 may support synchronous audio/video streaming by configuring the source device 105 to discover the roles and capabilities of a plurality of sink devices 110-*a* (through 110-*c*). In some examples, the source device 105 may determine whether the capabilities of the plurality of sink devices 110 satisfy the required configuration for synchronous streaming service. Upon determining that the capabilities of the sink devices 110 match the required criteria, the display services of the source and each sink device may utilize the ASP to perform P2P provision discovery and form a P2P group. In some examples, the ASP session may be created between the source device 105 and each sink device 110. Additionally or alternatively, when supported, the source device 105 and the plurality of sink devices 110 may utilize an existing infra-structure connection to establish an ASP session.

Thus, in accordance with the present disclosure, the sink device 110 may advertise the synchronous streaming service and a source device 105 may discover the synchronous streaming service using the ASP interface between the display service and ASP. ASP interface may provide a method or function call that a service entity may use to instruct ASP to perform various functions, such as advertise service (i.e., service advertiser role), seek service (i.e., service seeker role), setup ASP session, or combination thereof. In some examples, a source device 105 that seeks to discover the sink devices 110 that may be capable of receiving audio content may specify the requisite services sought. In one or more examples, the display service in a source device 105 may issue a "seek service" primitive in order to initiate discovery of multi-sink synchronous streaming service by calling a "seek service" function of the ASP. The "seek service" function call may identify capabilities sought by the source device 105 in the sink devices 110. The sink device 110 capabilities may include one or more of display device information, display associated BSSID, display audio formats, display video formats, display 3D video formats, display content protection, display coupled sink information, display extended capability, display local IP address, display session information, display alternative MAC address, display synchronous streaming information, or display concurrent session capability, or combination thereof.

In response to the seek service function call, one or more sink devices 110 that are capable of multi-sink audio rendering may advertise their capabilities to the source device 105 via service information parameter. The service information parameter may include the universal transformation format-8 bit (UTF-8) string corresponding to the synchronous streaming service capability bitmap as one of the display capability value. In some examples, the service information parameter may include the UTF-8 encoded TXT record fields with one or more key-value pair records for which the format, character set and maximum length etc. is specified based on the multicast domain name service (mDNS) or DNS based service discovery syntax using RFC6763. In one or more examples, the synchronous streaming information field may contain minimum of first M bytes that include sub-fields which are always present such as to indicate device type/sub-type, audio handling capability, speaker role or position followed by N bytes of vendor specific field which may include optional vendor specific service information. In some examples, the speaker role or position field present in the first part of service information (i.e. first M bytes) are specified using the speaker location naming specified in CEA 861.2 specification consistent with the multi-channel allocation as in ISO/IEC 62574. In some examples, the N bytes of vendor specific service capability information may be used to include additional capability details, such as name of the sink device 110 or additional attributes supported by the sink devices. In other examples, the service information may be transmitted using an extensible markup language (XML) structure.

Additionally or alternatively, the display service in a source device 105 may also use advertise service primitive to get discovered by a sink device and discover its capabilities. When a source device 105 is capable of supporting concurrent sessions with multiple sinks, the source device 105 may include concurrent session capability field in the service information so that more than one sink device 110 may setup concurrent ASP session with the source device 105. In some examples, when the ASP session is setup for multi-sink audio service, the ASP P2P group formation may be performed by constraining the connection capability exchange such that the WFD source device 105 (i.e., service seeker) may assume the role of a group owner (GO) and each sink device 110 (i.e., service advertiser) as a P2P client so that the GO negotiation may be skipped. In some examples, the connection setup and ASP session setup between the source device 105 and the sink device 110 may be performed over an infra-structure network.

In accordance with the present disclosure, after the source device 105 and sink devices 110 may have completed the service discovery and the ASP session established, the devices may perform the wireless display session setup. In some examples, the wireless display session may be interchangeably referred to as Wi-Fi display session. In some examples, the wireless display session may involve RTSP capability negotiation between the source device 105 to each sink device 110 over the TCP connections between them. In some examples, the RTSP capability negotiation may include the source device 105 to query each sink device 110 by performing RTSP get parameter request and response message exchanges that include synchronous streaming service capability parameter indicating the device type/sub-type, audio handling capability, and speaker role or position and timing synchronization state. For the synchronous streaming service requiring multiple sinks, user's interaction or the audio application 120 may configure the Miracast® session to assign each sink device 110 (e.g., speakers) to assume a unique speaker role based on the setup so that the source device 105 may route the corresponding audio channels to the sink device 110. Alternatively, the sink device 110 may extract the channel information from an aggregated audio content (e.g., encoded multichannel content).

Accordingly, the source device 105 may transmit RTSP set parameter request message to each sink device 110 containing synchronous streaming configuration parameter along with other RTSP parameters for session setup. The synchronous streaming configuration parameters may contain the speaker role that each sink device 110 is configured to assume for audio rendering based on the type of audio content. In some examples, the RTSP set parameter request message may also include the audio codecs parameter which may identify the audio codec and mode that may be used for the streaming. Thus, the synchronous streaming configuration may provide sink devices 110 details of the audio content and configuration. In some examples, the post-association capability negotiation between the source device 105 and each of the sink devices 110 may utilize real time streaming protocol (RTSP) in a transmission control protocol (TCP) connection between the source device 105 and the plurality of sink devices 110.

Figure 2:
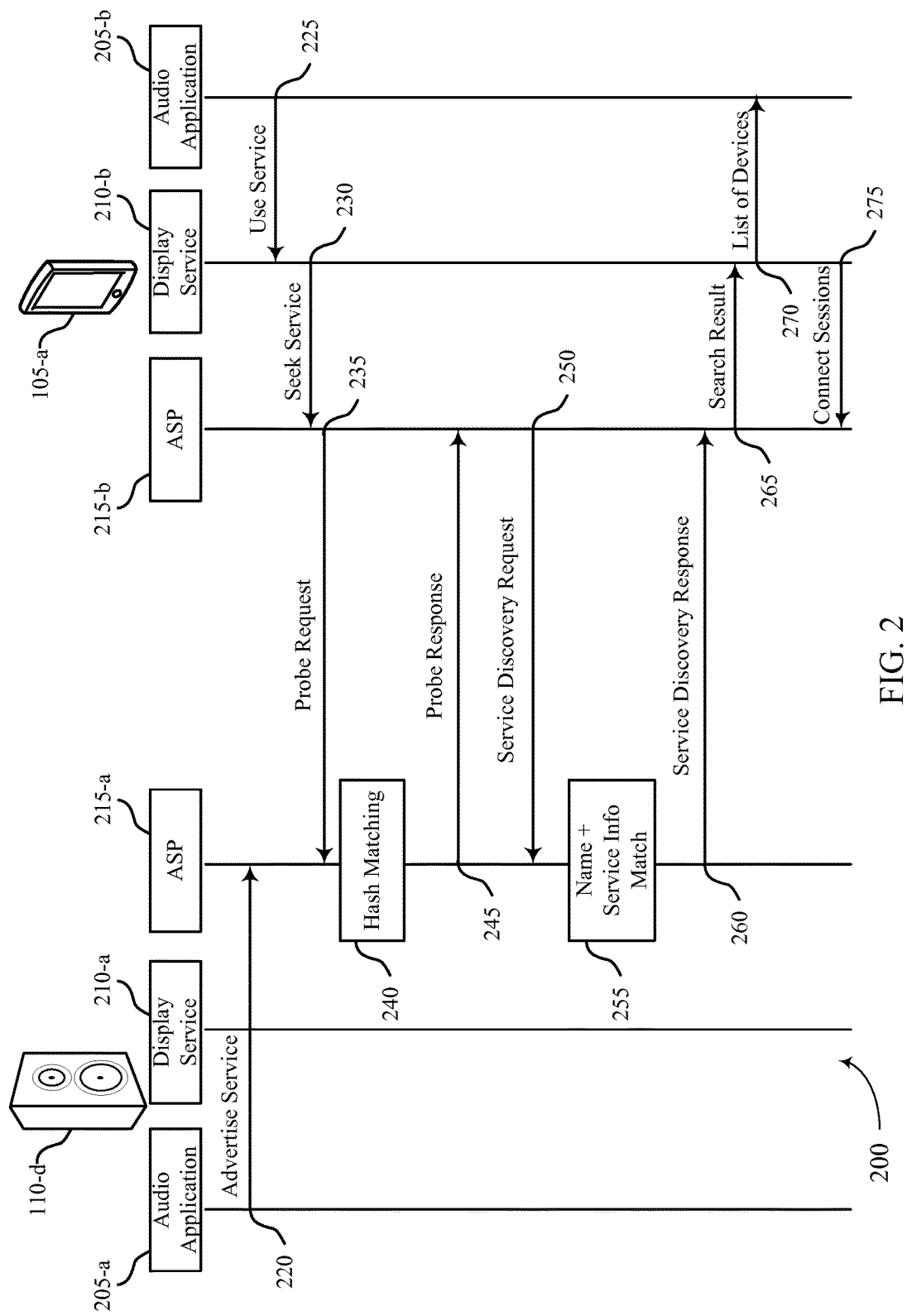
FIG. 2 illustrates an example of a process flow for discovery and management of synchronous audio/video streaming service to multiple sinks in wireless display system in accordance with various aspects of the present disclosure.

FIG. 2 illustrates an example of a process flow 200 for ASP discovery for synchronous streaming service setup in accordance with various aspects of the present disclosure. Process flow 200 may include a source device 105-a, which may be an example of a source device 105 described with reference to FIG. 1. Process flow 200 may also include a sink device 110-d, which may be an example of a sink device 110 described above with reference to FIG. 1. Sink device 110-d may advertise services which it supports to other devices. Sink device 110-d may include an audio application 205-a, a display service 210-a, and an ASP 215-a, which may communicate with each other. Similarly, source device 105-*a* may also include an audio application 205-*b*, a display service 210-*b*, and an ASP 215-*b*. Although described with reference to a single sink device 110-*d*, the steps of process flow 200 may be used with a plurality of sink devices 110.

For example, in some cases, a source device 105 may wish to discovery sink devices 110 which are capable of supporting a particular service (e.g., audio streaming). In such an instance, the source device 105 may discover the roles and capabilities of each sink device 110 (e.g., speaker type, audio formats, etc.). The source device 105 may use the role and capability information of each sink device 110 to determine if the sink device 110 is compatible with the setup for the audio service/profile. If the sink device 110 is compatible, the display service in the source device 105 and the display service in each sink device 110 may use the ASP to perform P2P provision discovery and then form a P2P group. In other words, an ASP session is created between the source device 105 and each sink device 110. In some cases, the ASPs may use infra-structure connections for the ASP sessions. Post-association, the source device 105 and the sink devices 110 may perform capability negotiations using the real-time streaming protocol (RTSP). After RTSP negotiations are completed, the source device 105 may stream audio content to the sink device 110.

At step 220, the audio application 205-*a* may advertise service to ASP 215-*a* associated with sink device 110-*d*. The service may be broadcast to other devices in the vicinity. At step 225, the source device 105-*a* may determine that it seeks to discover sink devices 110 which are capable of offering a certain type of service (e.g., reception of audio-only content). Thus, the audio application 205-*b* may communicate to display service 210-*b* that an audio-only service is requested. Accordingly, at step 230, the display service 210-*b* may communicate with ASP 215-*b* to seek a service. In response, at step 235, the ASP 215-*b* transmit an ASP P2P probe request to the sink device 110-*d*. In some cases the probe request may include a service hash. Sink device 110-*d* may receive the probe request, and the service hash, and use the service hash to determine that the service sought by source device 105-*a* is offered by sink device 110-*d* (i.e., at step 240, the ASP 215-*a* may perform hash matching). Subsequently, at step 245, the sink device 110-*d* may send, via the ASP 215-*a*, an ASP P2P probe response to the source device 105-*a*. The probe response may include information specific to sink device 110-*d* capabilities, such as the names of services sink device 110-*d* offers, and advertisement identity (ID).

Upon reception of the probe response from sink device 110-*d*, source device 105-*a* may, at step 250, transmit an ASP P2P service discovery request to sink device 110-*d*. The service discovery request may include service names and service information (e.g., display capabilities and corresponding bitmap values) requested by sink device 110-*d*. At step 255, sink device 110-*d* may match the service information and services names conveyed by the service discovery request to service information and service names related to sink device 110-*d*. Thus, at step 260, sink device 110-*d* may send an ASP P2P service discovery response to source device 105-*a*. The service discovery response may include the matched service names and service information (e.g., audio streaming), as well as an advertisement ID. At step 265, the ASP 215-*b* may communicate the results of the search for services to the display service 210-*b*. Thus, at step 270, the display service 210-*b* may communicate, using the information conveyed by the search result, a list of devices to the audio application 205-*b*. Subsequently, the audio application 205-*b* may communicate to display service 210-*b* a selected device (e.g., sink device 110-*d*). Display service 210-*b* may communicate with ASP 215-*b* information to begin a connection session 275.

Figure 3:
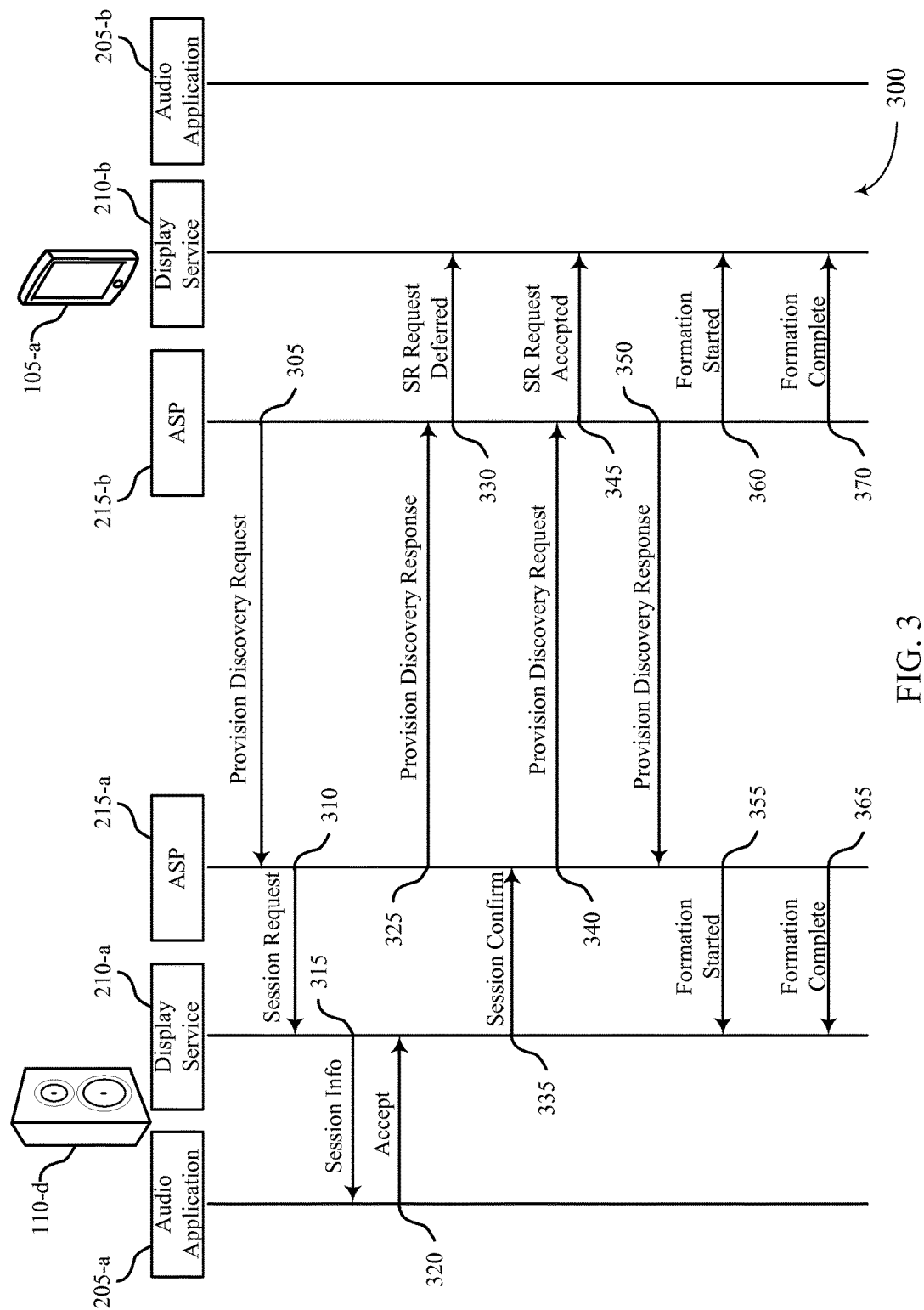
FIG. 3 illustrates an example of a process flow for discovery and management of synchronous audio/video streaming service to multiple sinks in wireless display system in accordance with various aspects of the present disclosure.

FIG. 3 illustrates an example of a process flow 300 for ASP P2P connection provisioning for synchronous streaming service setup in accordance with various aspects of the present disclosure. The process flow 300 may be implemented by source device 105-*a* and sink device 110-*d*, and may occur after the process flow 200 for ASP discovery for display service as described in FIG. 2.

At step 305, source device 105-*a* may, via the ASP 215-*b*, transmit a provision discovery request to sink device 110-*d*. In some cases the discovery request may include session information and connection capability. At step 310, the ASP 215-*b* may inform the display service 210-*b* that the service request has been sent. Additionally, the ASP 215-*a* may inform the display service 210-*a* that a session has been requested. At step 315, the display service 210-*a* may communicate session information to the audio application 205-*a*. At step 320, the audio application may accept the session parameters requested by the provision discovery request. At step 325, sink device 110-*d* may transmit to source device 105-*a* an ASP P2P provision discovery response which may include information indicating that the status has been deferred. The ASP 215-*b* may relay the status information to the display service 210-*b* (e.g., at step 330 the ASP 215-*b* may communicate to display service 210-*b* that the service request has been deferred).

At step 335, the display service 210-*a* may communicate a session confirmation to the ASP 215-*a*. Subsequently, at step 340, sink device 110-*d* may, via the ASP 215-*a*, transmit a provision discovery request to source device 105-*a*. The provision discovery request may include information such as the status (e.g., success) of request from source device 105-*a*, as well as session information. Also at step 345, the ASP 215-*b* may communicate to the display service 210-*b* the status (e.g., accepted) of the service request. Thus, at step 350, source device 105-*a* may transmit a provision discovery response to sink device 110-*d*. In some examples, the provision discovery request may include connection capability information. In some examples, source device 105-*a* and sink device 110-*d* may attempt to join a P2P group formation or join an existing P2P group. In such cases, the connection status may be conveyed from the ASP 215 to the display service 210. For example, at step 355, the ASP 215-*a* may communicate P2P group connection status information to the display service 210-*a* (e.g., the ASP 215-*a* may communicate that a group formation has started). Similarly, at step 360, the ASP 215-*b* may communicate P2P group connection status information to the display service 210-*b*. At step 365 the ASP 215-*a* may communicate to the display service 210-*a* that the group formation is complete. At step 370 the ASP 215-*b* may communicate to the display service 210-*b* that the group formation is complete.

Figure 4:
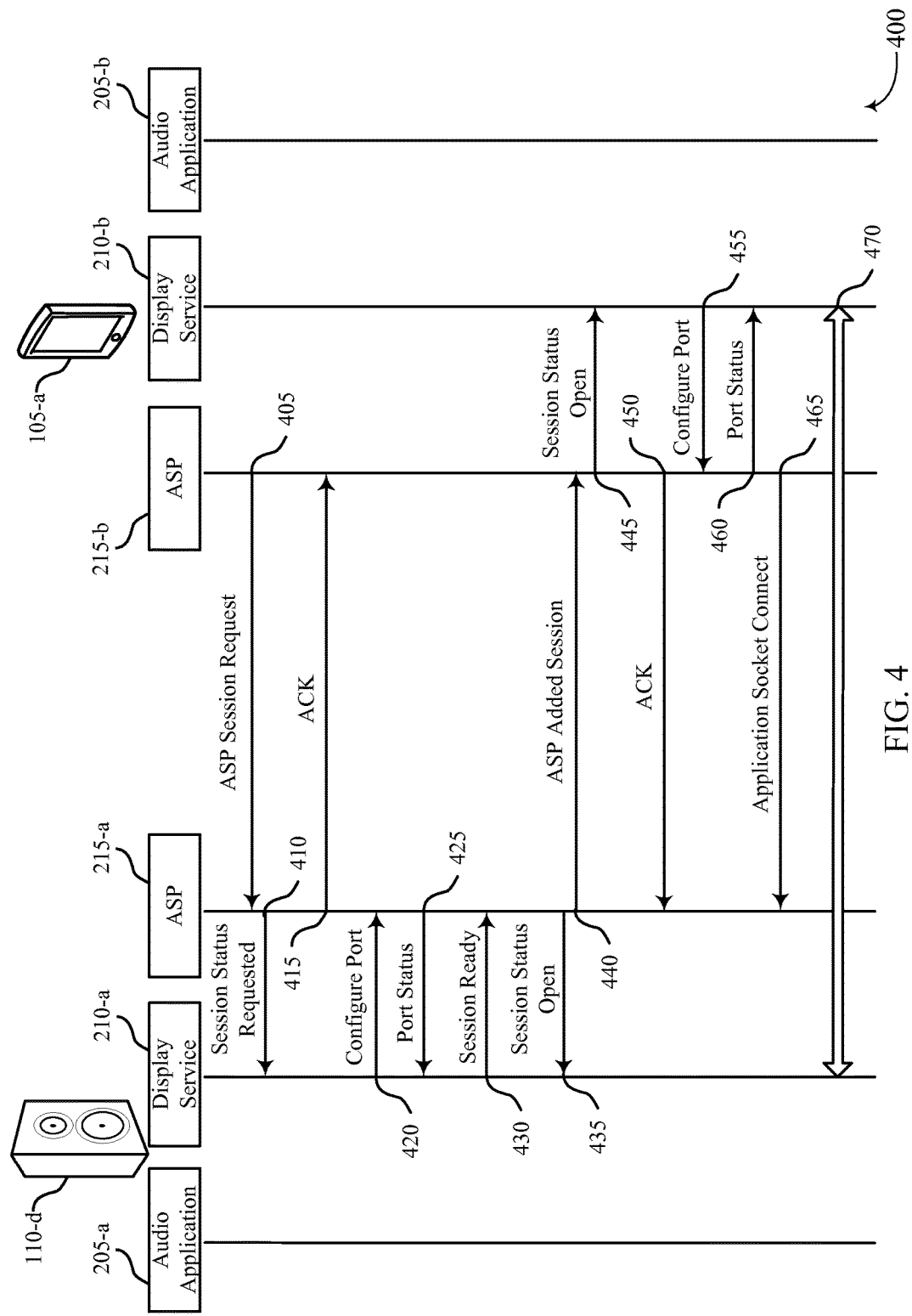
FIG. 4 illustrates an example of a process flow for discovery and management of synchronous audio/video streaming service to multiple sinks in wireless display system in accordance with various aspects of the present disclosure.

FIG. 4 illustrates an example of a process flow 400 for ASP display session creation for synchronous streaming service setup in accordance with various aspects of the present disclosure. The process flow 400 may be implemented by source device 105-*a* and sink device 110-*d*, and may occur after the process flow 200 and 300, as described with reference to FIGS. 2 and 3.

At step 405, source device 105-*a* may, via ASP 215-*b*, send an ASP session request to sink device 110-*d*. The ASP session request may include information pertaining to an advertisement ID, a media access control (MAC) address, and a session ID. The ASP 215-*b* may convey information to display service 210-b pertaining to the status of the session (e.g., the ASP 215-b may communicate that the session has been initiated). In some examples, at step 410, the ASP 215-a may convey to the display service 210-a that a session has been requested (i.e., the ASP may communicate session status information to the display service 210-a). At step 415, sink device 110-d may, via the ASP 215-a, send an acknowledgment (ACK) to source device 105-a, which may indicate that sink device 110-d received the ASP session request. At step 420, the display service 210-a may communicate with the ASP 215-a to configure a port. For instance, the display service 210-a may communicate a request for a port to the ASP 215-a. Additionally, the display service 210-a may communicate a port bound to the ASP 215-a. Subsequently, at step 425, the ASP 215-a may convey the status of a port to the display service 210-a. Once the display service 210-a has the port information, the display service may indicate to the ASP 215-a, at step 430, that the session is ready. At step 435, the ASP 215-a may convey connection status information (e.g., that the session is open) to the display service 210-a. The ASP 215-a may also be used by sink device 110-d to transmit an ASP added session message to source device 105-a. At step 440, the ASP 215-a may transmit an ASP added session message to the ASP 215-b of the source device. In response, the ASP 215-b, at step 445, may communicate the status of the session (e.g., that it is open) to the display service 210-b. Thus, at step 450, source device 105-a may, via the ASP 215-b, transmit an ACK to sink device 110-d. The ACK may indicate that source device received the ASP added session message. At step 455, the display service 210-b may communicate port configuration information to ASP 215-b. The information may include a port request and a port bound. Accordingly, at step 460, the ASP 215-b may communicate a port status to the display service 210-b. At step 465, source device 105-a may transmit an application socket connect message to sink device 110-b. Thus, Wi-Fi display capability negotiation and session setup (RTSP) may occur. For example, Wi-Fi display capability exchanges may occur between display services 210-a and 210-b. Additionally, in some cases, Wi-Fi display session setup messages may be communicated between display service 210-a and display service 210-b. Thus, at step 470, the display service 210-a of the sink device 110-d and the display service 210-b of the source device 105-a may exchange Wi-Fi display capabilities and setup Wi-Fi display session during the RTSP capability negotiation and Wi-Fi display session setup period.

Figure 5:
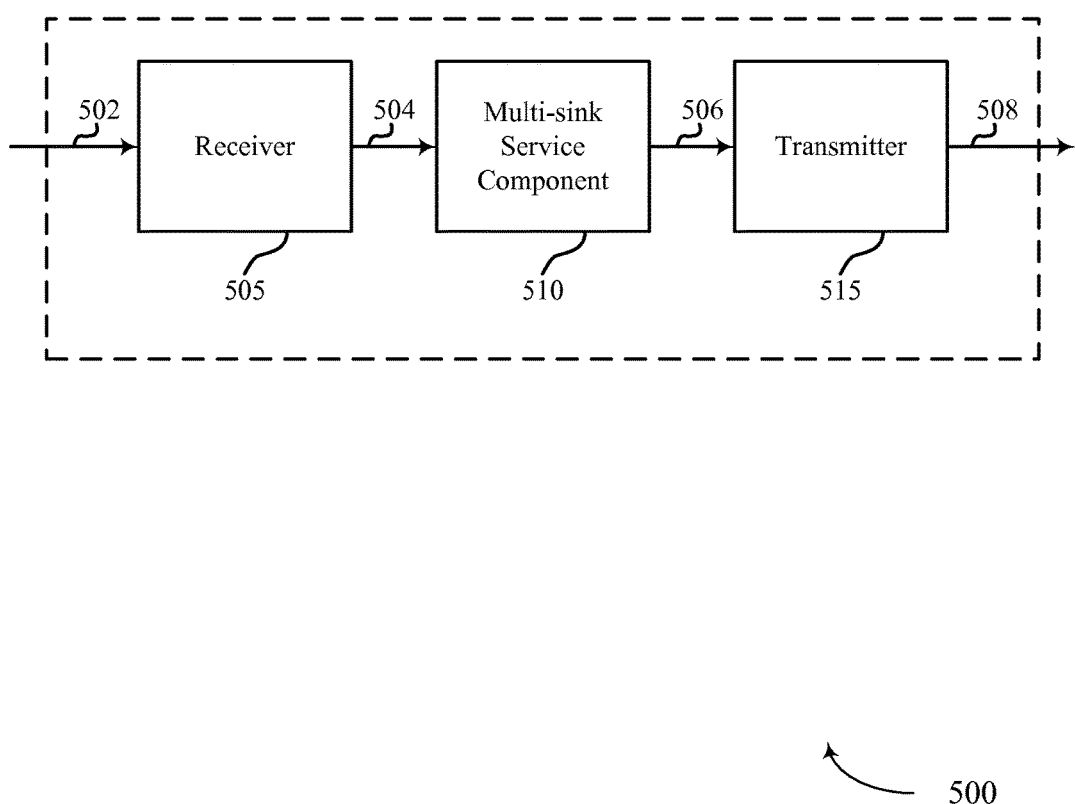
FIG. 5 shows a block diagram of a source device configured for discovery and management of synchronous audio/video streaming service to multiple sinks in wireless display system in accordance with various aspects of the present disclosure.

FIG. 5 shows a block diagram of a wireless device 500 configured for discovery and management of synchronous audio streaming service to multiple sinks in wireless display system in accordance with various aspects of the present disclosure. Wireless device 500 may be an example of aspects of a source device 105 described with reference to FIGS. 1-4. Wireless device 500 may include a receiver 505, a multi-sink service component 510, or a transmitter 515. Wireless device 500 may also include a processor. Each of these components may be in communication with each other.

The components of wireless device 500 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, and information related to discovery and management of synchronous audio streaming service to multiple sinks in wireless display system, etc.) over communication link 502. Information may be passed on to the multi-sink service component 510 via link 504, and to other components of wireless device 500.

The multi-sink service component 510 may receive service capabilities of each of a plurality of sink devices, determine that the service capabilities of the plurality of sink devices correspond with at least one service sought by the source device, and establish an application service platform (ASP) session between the source device and the plurality of sink devices based at least in part on the determining.

The transmitter 515 may receive information from multi-sink service component 510 via link 506 and transmit signals 508 received from other components of wireless device 500. In some embodiments, the transmitter 515 may be collocated with the receiver 505 in a transceiver component. The transmitter 515 may include a single antenna, or it may include a plurality of antennas.

Figure 6:
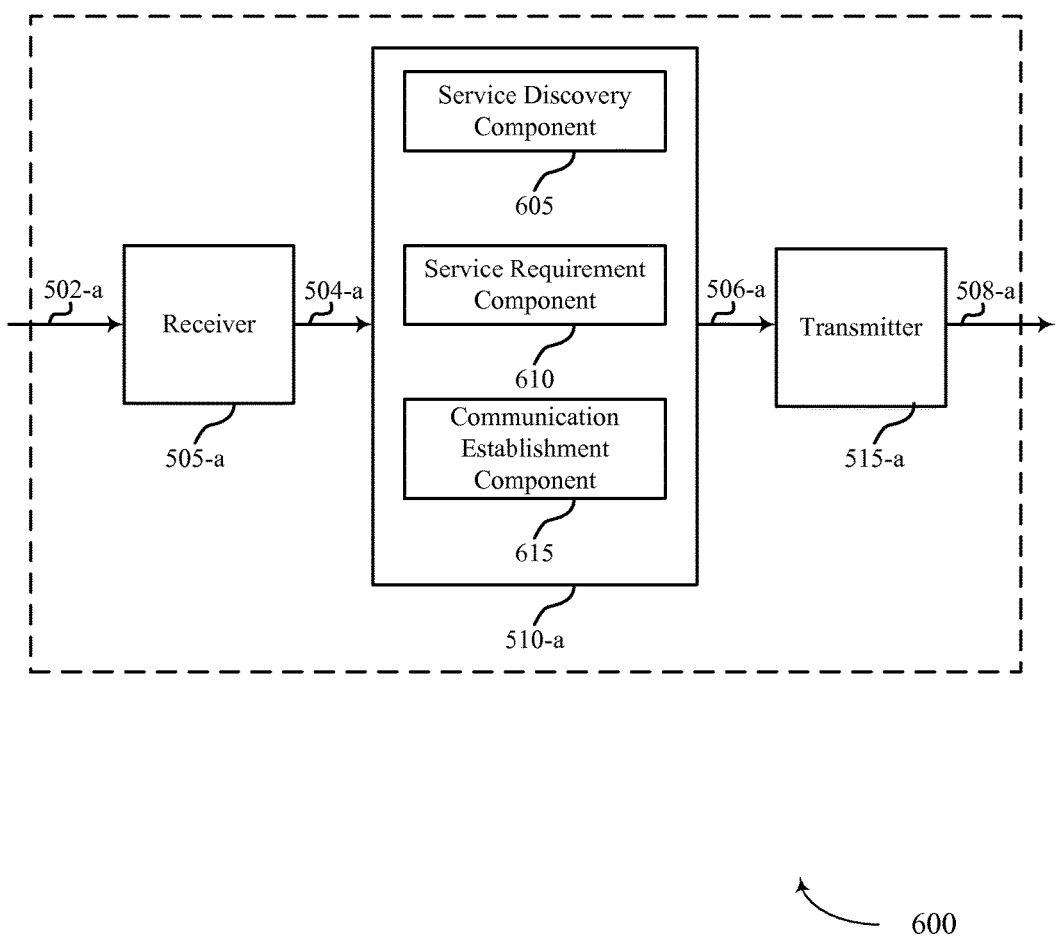
FIG. 6 shows a block diagram of a source device configured for discovery and management of synchronous audio/video streaming service to multiple sinks in wireless display system in accordance with various aspects of the present disclosure.

FIG. 6 shows a block diagram of a wireless device 600 for discovery and management of synchronous streaming service to multiple sinks in wireless display system in accordance with various aspects of the present disclosure. Wireless device 600 may be an example of aspects of a wireless device 500, a source device 105 or sink device 110 described with reference to FIGS. 1-5. Wireless device 600 may include a receiver 505-a, a multi-sink service component 510-a, or a transmitter 515-a. Wireless device 600 may also include a processor. Each of these components may be in communication with each other. The multi-sink service component 510-a may also include a service discovery component 605, a service requirement component 610, and a communication establishment component 615.

The components of wireless device 600 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 505-a may receive information from link 502-a, which may be passed on to multi-sink service component 510-a via link 504-a, and to other components of device 600. The multi-sink service component 510-a may perform the operations described above with reference to FIG. 5. The transmitter 515-a may transmit signals received from other components of wireless device 600.

The service discovery component 605 may receive service capabilities of each of a plurality of sink devices as described above with reference to FIGS. 2-4. In some examples, the service capabilities of the plurality of sink devices are received in response to the source device initiating a service discovery. In some examples, the service capabilities include at least one of device information, associated basic service set identification (BSSID), supported audio formats, supported video formats, three-dimensional (3-D) video format, content protection, coupled sink information, extended capability, local IP address, display session information, MAC address, synchronous streaming information, or concurrent session capability, or a combination thereof. The synchronous streaming information includes at least one of a type of sink device, a type of content for synchronous rendering, content handling capability, pre-configured role of the plurality of sink devices, supported method of timing synchronization, supported connection topology and discovery methods, or vendor information, or a combination thereof. In accordance with the present disclosure, the sink device may advertise its capabilities by assuming the role of a service advertiser and providing service information for queries from a source device corresponding to audio/video service discovery.

The service requirement component 610 may determine that the service capabilities of the plurality of sink devices correspond with at least one service sought by the source device as described above with reference to FIGS. 2-4.

The communication establishment component 615 may establish an application service platform (ASP) session between the source device and the plurality of sink devices based at least in part on the determining as described above with reference to FIGS. 2-4. In some examples, the ASP session between the source device and the plurality of sink devices capable of a synchronous streaming service may be performed over an infra-structure network.

Figure 7:
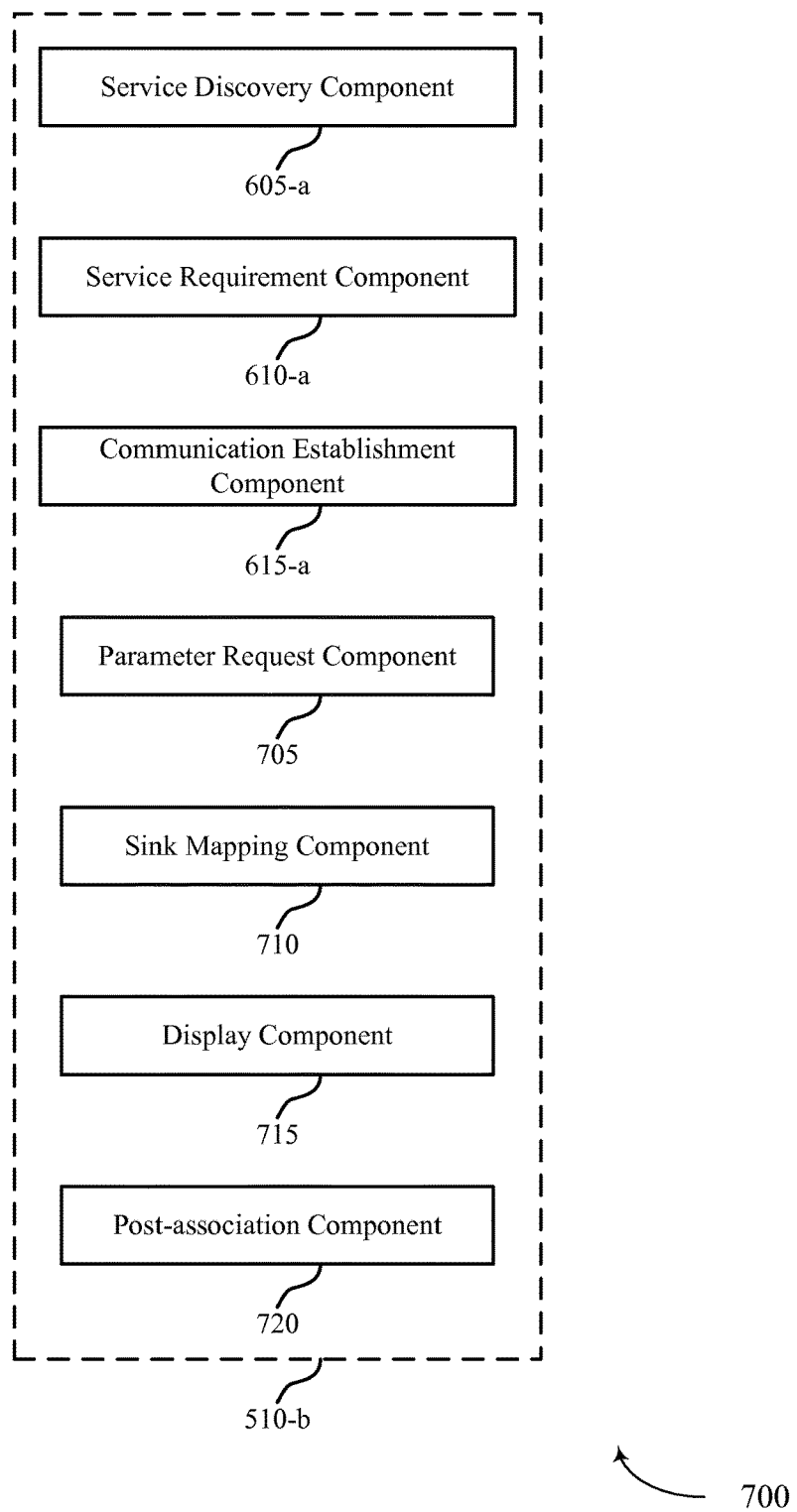
FIG. 7 shows a block diagram of a multi-sink service component configured for discovery and management of synchronous audio/video streaming service to multiple sinks in wireless display system in accordance with various aspects of the present disclosure.

FIG. 7 shows a block diagram 700 of a multi-sink service component 510-b which may be a component of a wireless device 500 or a wireless device 600 for discovery and management of synchronous streaming service to multiple sinks in wireless display system in accordance with various aspects of the present disclosure. The multi-sink service component 510-b may be an example of aspects of a multi-sink service component 510 described with reference to FIGS. 5-6. The multi-sink service component 510-b may include a service discovery component 605-a, a service requirement component 610-a, and a communication establishment component 615-a. Each of these components may perform the functions described above with reference to FIG. 6. The multi-sink service component 510-b may also include a parameter request component 705, a sink mapping component 710, a display component 715, and a post-association component 720.

The components of the multi-sink service component 510-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The parameter request component 705 may transmit a parameter request message to the plurality of sink devices for service information required for a synchronous streaming service setup as described above with reference to FIGS. 2-4. In some examples, the parameter request message includes an audio codec parameter indicating an audio codec and a mode associated with audio streaming. In some examples, the parameter request message queries a pre-assigned roles of the plurality of sink devices.

The sink mapping component 710 may map the plurality of sink devices based at least in part on the capabilities of the sink devices to render content type as described above with reference to FIGS. 2-4. The display component 715 may display a name or an ID indicating the role of at least one sink device on a display of the source device as described above with reference to FIGS. 2-4.

The post-association component 720 may initiate post-association capability negotiation between the source device and the plurality of sink devices, wherein the post-association capability negotiation utilizes real time streaming protocol (RTSP) in a TCP connection between the source device and the plurality of sink devices as described above with reference to FIGS. 2-4. In some examples, the post-association capability negotiation comprises a setup request from the source device to include synchronous streaming configuration parameter to setup synchronous streaming session.

Figure 8:
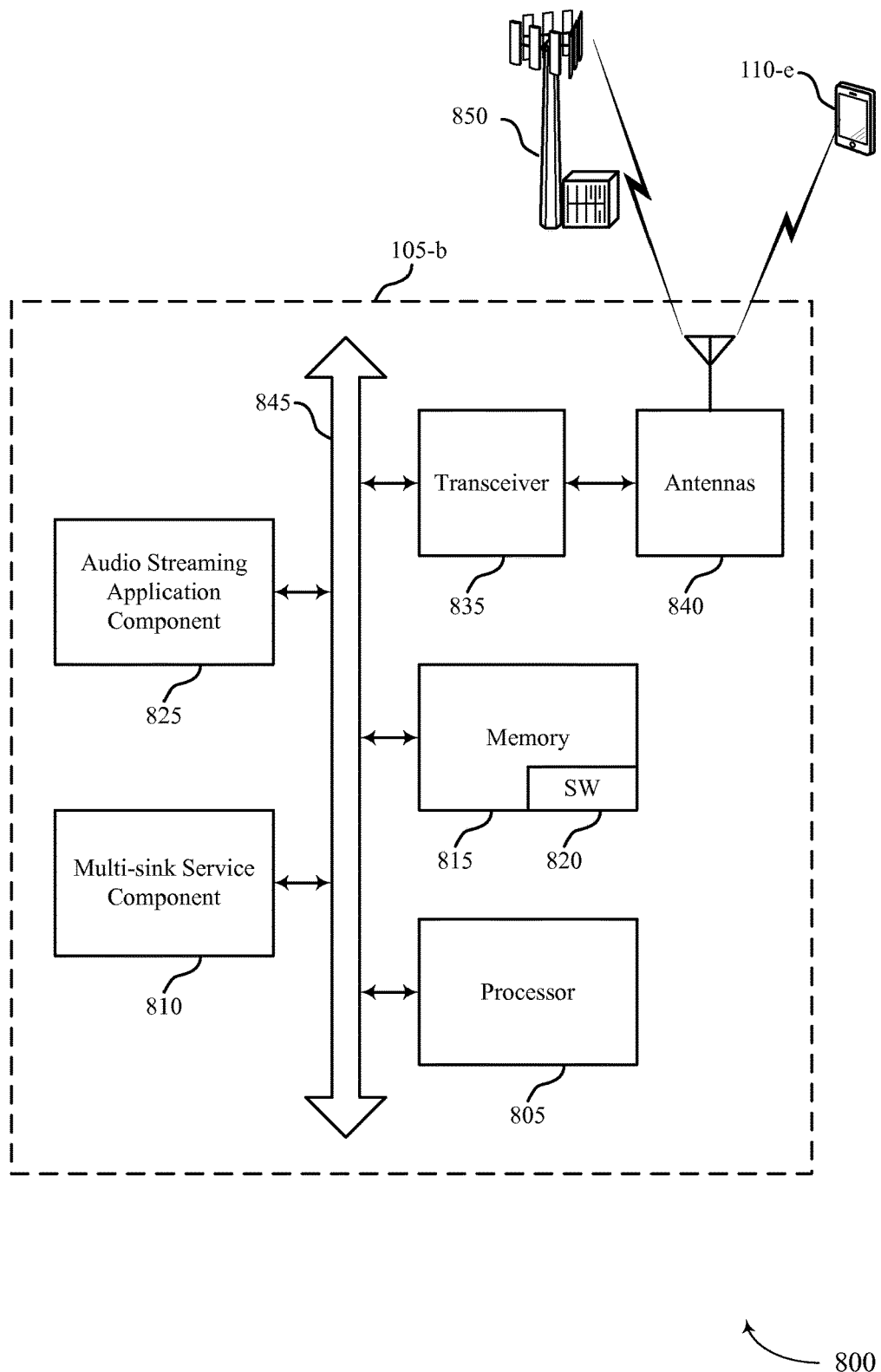
FIG. 8 illustrates a block diagram of a system including a mobile device configured for discovery and management of synchronous audio/video streaming service to multiple sinks in wireless display system in accordance with various aspects of the present disclosure.

FIG. 8 shows a diagram of a system 800 including a source device 105-b configured for discovery and management of synchronous streaming service to multiple sinks in wireless display system in accordance with various aspects of the present disclosure. System 800 may include source device 105-b, which may be an example of a wireless device 500, a wireless device 600, source device 105 described above with reference to FIGS. 1, 2 and 5-7. The source device 105-b may include a multi-sink service component 810, which may be an example of a multi-sink service component 810 described with reference to FIGS. 5-7. The source device 105-b may also include an audio streaming application component 825. The audio streaming application component 825 may be configured to map the discovered sink devices and allow the user to select the speaker names based on the profile. The source device 105-b may also include components for bi-directional voice and data communications including components for transmitting communications and components for receiving communications.

The source device 105-b may also include a processor component 805, and memory 815 (including software (SW)) 820, a transceiver component 835, and one or more antenna(s) 840, each of which may communicate, directly or indirectly, with one another (e.g., via buses 845). The transceiver component 835 may communicate bi-directionally, via the antenna(s) 840 or wired or wireless links, with one or more networks, as described above. For example, the transceiver component 835 may communicate bi-directionally with access point 850 or sink device(s) 110-e. The transceiver component 835 may include a modem to modulate the packets and provide the modulated packets to the antenna(s) 840 for transmission, and to demodulate packets received from the antenna(s) 840. While source device 105-b may include a single antenna 840, source device 105-b may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor component 805 to perform various functions described herein (e.g., discovery and management of synchronous streaming service to multiple sinks in wireless display system, etc.). Alternatively, the software/firmware code 820 may not be directly executable by the processor component 805 but cause a computer (e.g., when compiled and executed) to perform functions described herein. The processor component 805 may include an intelligent hardware device, (e.g., a central processing unit (CPU), a microcontroller, an ASIC, etc.)

In one embodiment, components, for example as shown in FIGS. 5-8, each include a circuit or circuitry for discovery and management of synchronous streaming service to multiple sinks in a wireless display system.

Figure 9:
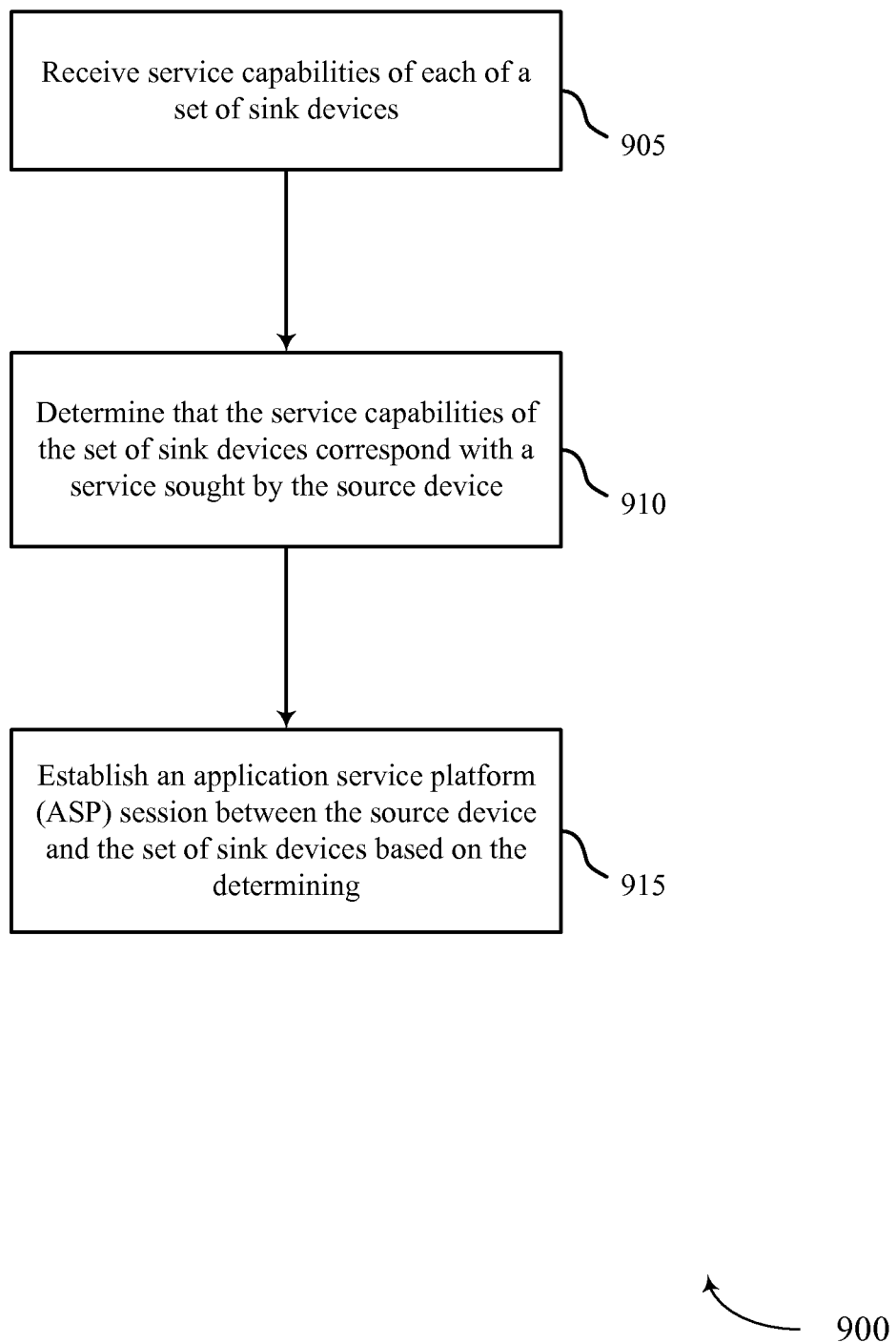
FIG. 9 shows a flowchart illustrating a method for discovery and management of synchronous audio/video streaming service to multiple sinks in wireless display system in accordance with various aspects of the present disclosure.

FIG. 9 shows a flowchart illustrating a method 900 for discovery and management of synchronous streaming service to multiple sinks in a wireless display system in accordance with various aspects of the present disclosure. The operations of method 900 may be implemented by a source device 105 or its components as described with reference to FIGS. 1-8. For example, the operations of method 900 may be performed by the multi-sink service component 510 as described with reference to FIGS. 5-8. In some examples, a source device 105 may execute a set of codes to control the functional elements of the source device 105 to perform the functions described below. Additionally or alternatively, the source device 105 may perform aspects the functions described below using special-purpose hardware.

At block 905, the source device 105 may receive service capabilities of each of a plurality of sink devices as described above with reference to FIGS. 2-4. In certain examples, the operations of block 905 may be performed by the service discovery component 605 as described above with reference to FIG. 6.

At block 910, the source device 105 may determine that the service capabilities of the plurality of sink devices correspond with at least one service sought by the source device as described above with reference to FIGS. 2-4. In certain examples, the operations of block 910 may be performed by the service requirement component 610 as described above with reference to FIG. 6.

At block 915, the source device 105 may establish an application service platform (ASP) session between the source device and the plurality of sink devices based at least in part on the determining as described above with reference to FIGS. 2-4. In certain examples, the operations of block 915 may be performed by the communication establishment component 615 as described above with reference to FIG. 6.

Thus, methods 900 may provide for discovery and management of synchronous streaming service to multiple sinks in wireless display system. It should be noted that methods 900 describe possible implementation, and that the operations and the steps may be rearranged or otherwise modified such that other implementations are possible.

Figure 10:
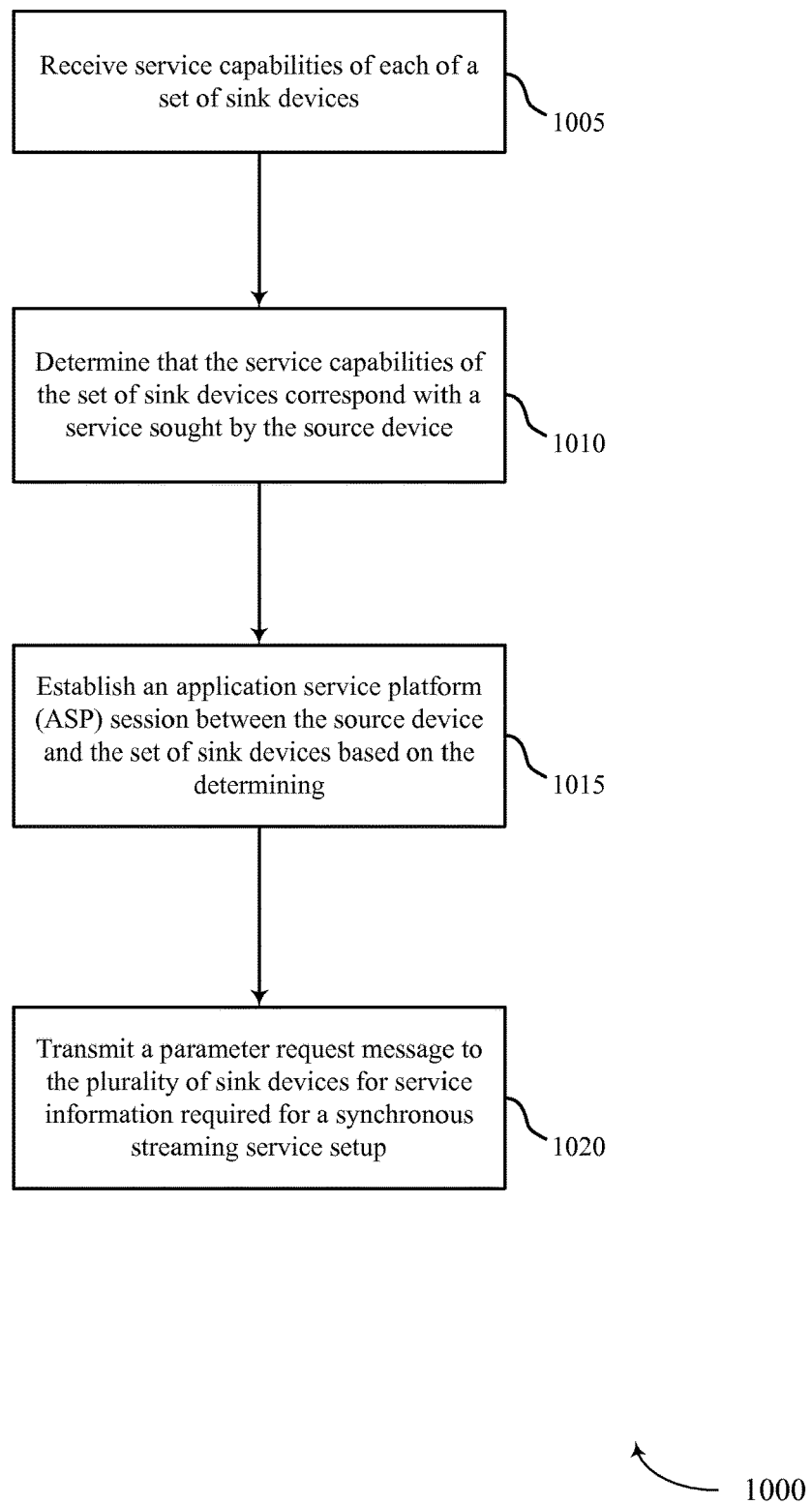
FIG. 10 shows a flowchart illustrating a method for discovery and management of synchronous audio/video streaming service to multiple sinks in wireless display system in accordance with various aspects of the present disclosure.

FIG. 10 shows a flowchart illustrating a method 1000 for discovery and management of synchronous streaming service to multiple sinks in wireless display system in accordance with various aspects of the present disclosure. The operations of method 1000 may be implemented by a source device 105 or its components as described with reference to FIGS. 1-8. For example, the operations of method 1000 may be performed by the multi-sink service component 510 as described with reference to FIGS. 5-8. In some examples, a source device 105 may execute a set of codes to control the functional elements of the source device 105 to perform the functions described below. Additionally or alternatively, the source device 105 may perform aspects the functions described below using special-purpose hardware.

At block 1005, the source device 105 may receive service capabilities of each of a plurality of sink devices as described above with reference to FIGS. 2-4. In certain examples, the operations of block 1005 may be performed by the service discovery component 605 as described above with reference to FIG. 6.

At block 1010, the source device 105 may determine that the service capabilities of the plurality of sink devices correspond with at least one service sought by the source device as described above with reference to FIGS. 2-4. In certain examples, the operations of block 1010 may be performed by the service requirement component 610 as described above with reference to FIG. 6.

At block 1015, the source device 105 may establish an application service platform (ASP) session between the source device and the plurality of sink devices based at least in part on the determining as described above with reference to FIGS. 2-4. In certain examples, the operations of block 1015 may be performed by the communication establishment component 615 as described above with reference to FIG. 6.

At block 1020, the source device 105 may transmit a parameter request message to the plurality of sink devices for service information required for a synchronous streaming service setup as described above with reference to FIGS. 2-4. In some examples, the parameter request message may include an audio codec parameter indicating an audio codec and a mode associated with the audio streaming. The parameter request message may also query a pre-assigned roles of the plurality of sink devices. In certain examples, the operations of block 1015 may be performed by the parameter request component 705 as described above with reference to FIG. 6.

Thus, methods 1000 may provide for discovery and management of synchronous streaming service to multiple sinks in wireless display system. It should be noted that methods 1000 describe possible implementation, and that the operations and the steps may be rearranged or otherwise modified such that other implementations are possible. In some examples, aspects from two or more of the methods 900 and 1000 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks, components, and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of service discovery at a source device, comprising:
    initiating a discovery for a synchronous streaming service with a plurality of sink devices, the initiating the discovery comprising at least transmitting an indication of a concurrent session capability of the source device for supporting concurrent sessions with multiple sink devices;
    receiving at least one of audio or video capabilities of each of the plurality of sink devices, the audio or video capabilities comprising a concurrent session capability for at least a multi-sink audio rendering;
    determining that the audio or video capabilities of each of the plurality of sink devices satisfy a configuration for the synchronous streaming service sought by the source device; and
    establishing, prior to establishing a Wi-Fi Display (WFD) session between the source device and the plurality of sink devices, a service discovery session between the source device and the plurality of sink devices based at least in part on determining that the audio or video capabilities of each of the plurality of sink devices satisfy the configuration for the synchronous streaming service sought by the source device.

2. The method of claim 1, further comprising:
    transmitting a parameter request message to the plurality of sink devices for service information required for setting up the synchronous streaming service.

3. The method of claim 2, wherein the parameter request message includes an audio codec parameter indicating an audio codec and a mode associated with audio streaming.

4. The method of claim 2, wherein the parameter request message queries a pre-assigned role or location of the plurality of sink devices.

5. The method of claim 1, further comprising:
    initiating post-association capability negotiation between the source device and the plurality of sink devices, wherein the post-association capability negotiation utilizes real time streaming protocol (RTSP) in a TCP connection between the source device and the plurality of sink devices.

6. The method of claim 5, wherein the post-association capability negotiation comprises a setup request from the source device to include synchronous streaming configuration parameters that include device role, type of content, synchronization method, or any combination thereof to set up the synchronous streaming service.

7. The method of claim 1, wherein the audio or video capabilities further comprises at least one of device information, associated basic service set identification (BSSID), supported audio formats, supported video formats, three-dimensional (3-D) video format, content protection, coupled sink information, extended capability, local internet protocol (IP) address, display session information, medium access control (MAC) address, synchronous streaming information, or any combination thereof.

8. The method of claim 7, wherein the synchronous streaming information includes at least one of a type of sink device, a type of content for synchronous rendering, content handling capability, a pre-assigned role or location of the plurality of sink devices, supported method of timing synchronization, supported connection topology and discovery methods, vendor information, or any combination thereof.

9. The method of claim 1, wherein receiving at least one of audio or video capabilities of each of the plurality of sink devices comprises the plurality of sink devices assuming a role of a service advertiser.

10. The method of claim 9, wherein the plurality of sink devices transmit service information containing capabilities required to set up the synchronous streaming service for a query corresponding to service discovery of the synchronous streaming service received from the source device.

11. The method of claim 1, further comprising:
mapping the plurality of sink devices based at least in part on the audio or video capabilities of each of the plurality of sink devices to render a content type.

12. The method of claim 1, further comprising:
displaying a name or an identification (ID) indicating a pre-assigned role or location of at least one sink device on a display of the source device.

13. The method of claim 1, wherein the service discovery session between the source device and the plurality of sink devices capable of the synchronous streaming service is performed over an infra-structure network or a peer-to-peer (P2P) connection.

14. The method of claim 1, wherein the audio or video capabilities are discovered during a pre-association state or during an infra-structure connection.

15. An apparatus for service discovery at a source device, comprising:
a service discovery component for initiating a discovery for a synchronous streaming service with a plurality of sink devices, the initiating the discovery comprising at least transmitting an indication of a concurrent session capability of the source device for supporting concurrent sessions with multiple sink devices, and for receiving at least one of audio or video capabilities of each of the plurality of sink devices, the audio or video capabilities comprising a concurrent session capability for at least a multi-sink audio rendering;
the service discovery component further configured for determining that the audio or video capabilities of each of the plurality of sink devices satisfy a configuration for the synchronous streaming service sought by the source device; and
a communication establishment component for establishing, prior to establishing a Wi-Fi Display (WFD) session between the source device and the plurality of sink devices, a service discovery session between the source device and the plurality of sink devices based at least in part on determining that the audio or video capabilities of each of the plurality of sink devices satisfy the configuration for the synchronous streaming service sought by the source device.

16. The apparatus of claim 15, further comprising:
a parameter request component for transmitting a parameter request message to the plurality of sink devices for service information required for setting up the synchronous streaming service.

17. The apparatus of claim 16, wherein the parameter request message includes an audio codec parameter indicating an audio codec and a mode associated with audio streaming.

18. The apparatus of claim 16, wherein the parameter request message queries a pre-assigned role or location of the plurality of sink devices.

19. The apparatus of claim 15, further comprising:
a post-association component for initiating post-association capability negotiation between the source device and the plurality of sink devices, wherein the post-association capability negotiation utilizes real time streaming protocol (RTSP) in a TCP connection between the source device and the plurality of sink devices.

20. The apparatus of claim 19, wherein the post-association capability negotiation comprises a setup request from the source device to include synchronous streaming configuration parameters that include device role, type of content, synchronization method, or any combination thereof to set up a synchronous streaming session.

21. The apparatus of claim 15, wherein the audio or video capabilities include at least one of device information, associated basic service set identification (BSSID), supported audio formats, supported video formats, three-dimensional (3-D) video format, content protection, coupled sink information, extended capability, local internet protocol (IP) address, display session information, medium access control (MAC) address, synchronous streaming information, or any combination thereof.

22. The apparatus of claim 21, wherein the synchronous streaming information includes at least one of a type of sink device, a type of content for synchronous rendering, content handling capability, a pre-assigned role or location of the plurality of sink devices, supported method of timing synchronization, supported connection topology and discovery methods, vendor information, or any combination thereof.

23. The apparatus of claim 15, wherein receiving at least one of the audio or video capabilities of each of the plurality of sink devices comprises the plurality of sink devices assuming a role of a service advertiser.

24. The apparatus of claim 23, wherein the plurality of sink devices transmit service information containing capabilities required to set up the synchronous streaming service for a query corresponding to service discovery of the synchronous streaming service received from the source device.

25. The apparatus of claim 15, further comprising:
a sink mapping component for mapping the plurality of sink devices based at least in part on the audio or video capabilities of each of the plurality of sink devices to render a content type.

26. The apparatus of claim 15, further comprising:
a display component for displaying a name or an identification (ID) indicating a pre-assigned role or location of at least one sink device on a display of the source device.

27. The apparatus of claim 15, wherein the service discovery session between the source device and the plurality of sink devices capable of the synchronous streaming service is performed over an infra-structure network or a peer-to-peer (P2P) connection.

28. The apparatus of claim 15, wherein the audio or video capabilities are discovered during a pre-association state or during an infra-structure connection.

29. An apparatus for service discovery at a source device, comprising:
a processor;
memory in electronic communication with the processor; and
instructions stored in the memory; wherein the instructions are executable by the processor to:
initiate a discovery for a synchronous streaming service with a plurality of sink devices, the initiating the discovery comprising at least transmitting an indication of a concurrent session capability of the source device for supporting concurrent sessions with multiple sink devices;

receive at least one of audio or video capabilities of each of the plurality of sink devices, the audio or video capabilities comprising a concurrent session capability for at least a multi-sink audio rendering;

determine that the audio or video capabilities of each of the plurality of sink devices satisfy a configuration for the synchronous streaming service sought by the source device; and establish, prior to establishing a Wi-Fi Display (WFD) session between the source device and the plurality of sink devices, a service discovery session between the source device and the plurality of sink devices based at least in part on determining that the audio or video capabilities of each of the plurality of sink devices satisfy the configuration for the synchronous streaming service.

30. The apparatus of claim 29, wherein the instructions are executable by the processor to:

transmit a parameter request message to the plurality of sink devices for service information required for setting up the synchronous streaming service.

31. The apparatus of claim 30, wherein the parameter request message includes an audio codec parameter indicating an audio codec and a mode associated with audio streaming.

32. The apparatus of claim 30, wherein the parameter request message queries a pre-assigned role or location of the plurality of sink devices.

33. The apparatus of claim 29, wherein the instructions are executable by the processor to:

initiate post-association capability negotiation between the source device and the plurality of sink devices, wherein the post-association capability negotiation utilizes real time streaming protocol (RTSP) in a TCP connection between the source device and the plurality of sink devices.

34. The apparatus of claim 33, wherein the post-association capability negotiation comprises a setup request from the source device to include synchronous streaming configuration parameters that include device role, type of content, synchronization method, or any combination thereof to set up a synchronous streaming session.

35. The apparatus of claim 29, wherein the audio or video capabilities include at least one of device information, associated basic service set identification (BSSID), supported audio formats, supported video formats, three-dimensional (3-D) video format, content protection, coupled sink information, extended capability, local internet protocol (IP) address, display session information, medium access control (MAC) address, synchronous streaming information, or any combination thereof.

36. The apparatus of claim 35, wherein the synchronous streaming information includes at least one of a type of sink device, a type of content for synchronous rendering, content handling capability, a pre-assigned role or location of the plurality of sink devices, supported method of timing synchronization, supported connection topology and discovery methods, vendor information, or any combination thereof.

37. The apparatus of claim 29, wherein the instructions are executable by the processor to:

map the plurality of sink devices based at least in part on the audio or video capabilities of each of the plurality of sink devices to render a content type.

38. The apparatus of claim 29, wherein the instructions are executable by the processor to:

display a name or an identification (ID) indicating a pre-assigned role or location of at least one sink device on a display of the source device.

39. The apparatus of claim 29, wherein the service discovery session between the source device and the plurality of sink devices capable of the synchronous streaming service is performed over an infra-structure network or peer-to-peer (P2P) connection.

40. A non-transitory computer-readable medium storing code for service discovery at a source device, the code comprising instructions executable to:

initiate a discovery for a synchronous streaming service with a plurality of sink devices, the initiating the discovery comprising at least transmitting an indication of a concurrent session capability of the source device for supporting concurrent sessions with multiple sink devices;

receive at least one of audio or video capabilities of each of the plurality of sink devices, the audio or video capabilities comprising a concurrent session capability for at least a multi-sink audio rendering;

determine that the audio or video capabilities of each of the plurality of sink devices satisfy a configuration for the synchronous streaming service sought by the source device; and establish, prior to establishing a Wi-Fi Display (WFD) session between the source device and the plurality of sink devices, a service discovery session between the source device and the plurality of sink devices based at least in part on determining that the audio or video capabilities of each of the plurality of sink devices satisfy the configuration for the synchronous streaming service sought by the source device.

* * * * *